UNITED STATES PATENT OFFICE.

PER GÖSTA EKSTRÖM, OF SKUTSKÄR, SWEDEN, ASSIGNOR TO STORA KOPPARBERGS BERGSLAGS AKTIEBOLAG, OF FALUN, SWEDEN, A CORPORATION OF SWEDEN.

METHOD OF PRODUCING ALCOHOL FROM THE WASTE SULFITE-CELLULOSE LYES.

1,035,086.     Specification of Letters Patent.     Patented Aug. 6, 1912.

No Drawing.     Application filed April 28, 1909. Serial No. 492,648.

*To all whom it may concern:*

Be it known that I, PER GÖSTA EKSTRÖM, a subject of the King of Sweden, and resident of Skutskär, in the Kingdom of Sweden, have invented certain new and useful Improvements in the Method of Producing Alcohol from Waste Sulfite-Cellulose Lyes, of which the following is a specification.

As is well known the waste lyes from sulfite cellulose factories contain fermentable sugar which may be converted into alcohol by means of fermentation. The condition of making this fermentation process possible is, however, that calcium bisulfite and sulfurous acid are first removed from the said lyes because the said substances act as poisons upon the yeast and kill the same.

In producing alcohol from waste sulfite cellulose lyes lime has hitherto been used for neutralizing the lyes, that is to say for removing bisulfite and sulfurous acid from the same. However, as it has been found necessary to reduce as much as possible the costs of raw materials employed in order to make the production of alcohol from waste sulfite cellulose lyes perfectly profitable, and as the lime hitherto employed for neutralizing purposes always causes certain expenses due to purchase and transport it has in this industry been considered highly desirable to get a cheaper neutralizing agent. This is attained according to the present invention by using as a neutralizing agent a lime mud which is obtained as a waste product in manufacturing cellulose according to the soda and sulfate cellulose methods. According to these methods wood or other material containing cellulose is boiled with caustic soda, the difference between the said methods consisting therein that the loss of alkali is covered in the soda cellulose method by adding sodium carbonate and in the sulfate cellulose method by adding sodium sulfate to the lye.

The above mentioned lime mud is obtained in the following manner. The lye employed in executing the boiling operation is, for regenerating the alkaline salts, evaporated to dryness and calcined or melted, whereby the organic constituents of the same are burned. The calcined or melted mass is then treated with hot water whereby the sodium carbonate formed by the calcining operation is dissolved. The solution thus formed is saturated with lime whereby sodium hydrate and calcium carbonate are formed, the latter being the above mentioned lime mud. This lime mud having hitherto formed a waste product of no value may thus be obtained free of cost. The same is not a pure calcium carbonate but because of its mode of formation it also contains some organic constituents, as for instance phosphoric acid, and, furthermore, salts of sodium and magnesium, the said substances forming nourishments for the yeast in the subsequent alcoholic fermentation. Thus by using the above mentioned lime mud for neutralizing waste sulfite cellulose lyes in producing alcohol from the same the double advantage is gained that the neutralizing agent costs little or nothing and that besides neutralizing the lye the said agent also enriches the same with nutritive matter for the yeast. The lye having in this manner been neutralized is now fermentable, and the same is then fermented in any suitable manner.

What I claim is:

In manufacturing alcohol by fermenting the waste lye from the sulfite pulp process the method of neutralizing the acid lye to be fermented and increasing its percentage of substances serving as yeast food during the fermentation process, which consists in adding to the acid lye lime mud obtained as a waste product in manufacturing cellulose according to the soda or sulfate cellulose method, substantially as and for the purpose set forth.

In witness whereof, I have hereunto signed my name in the presence of two subscribing witnesses.

PER GÖSTA EKSTRÖM.

Witnesses:
AXEL EHRNER,
ANNA SÖDERSTRÖM.